(12) United States Patent
Bolha et al.

(10) Patent No.: US 11,928,648 B2
(45) Date of Patent: Mar. 12, 2024

(54) SYSTEM AND METHOD FOR ITEM TRACKING

(71) Applicant: United States Postal Service, Washington, DC (US)

(72) Inventors: Rosemarie Bolha, Wilkes-Barre, PA (US); Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/060,261

(22) Filed: Nov. 30, 2022

(65) Prior Publication Data

US 2023/0087031 A1 Mar. 23, 2023

Related U.S. Application Data

(63) Continuation of application No. 16/746,726, filed on Jan. 17, 2020, now Pat. No. 11,526,842.

(60) Provisional application No. 62/794,142, filed on Jan. 18, 2019.

(51) Int. Cl.
| | |
|---|---|
| *G06Q 10/087* | (2023.01) |
| *G06K 7/14* | (2006.01) |
| *G06Q 10/0833* | (2023.01) |
| *H04L 9/40* | (2022.01) |
| *H04W 12/06* | (2021.01) |

(52) U.S. Cl.
CPC ......... *G06Q 10/087* (2013.01); *G06K 7/1413* (2013.01); *G06Q 10/0833* (2013.01); *H04L 63/08* (2013.01); *H04W 12/06* (2013.01)

(58) Field of Classification Search
CPC ............ G06Q 10/087; G06Q 10/0833; G06K 7/1413; H04L 63/08; H04W 12/07
See application file for complete search history.

(56) References Cited

U.S. PATENT DOCUMENTS

| | | | |
|---|---|---|---|
| 8,339,251 B2 | 12/2012 | Roberts, Sr. et al. | |
| 9,336,510 B2 | 5/2016 | Dearing et al. | |
| 10,496,095 B1 | 12/2019 | Bays et al. | |
| 10,628,794 B2* | 4/2020 | Dearing | G06Q 10/0833 |
| 2003/0192947 A1 | 10/2003 | Toedtli | |
| 2010/0030667 A1 | 2/2010 | Chudy et al. | |
| 2011/0046775 A1 | 2/2011 | Bailey et al. | |
| 2012/0265585 A1 | 10/2012 | Muirbrook et al. | |
| 2014/0087772 A1 | 3/2014 | Papa et al. | |
| 2014/0262690 A1 | 9/2014 | Henderson et al. | |

(Continued)

*Primary Examiner* — Paul Danneman
(74) *Attorney, Agent, or Firm* — Knobbe Martens Olson & Bear LLP

(57) ABSTRACT

Systems and methods for tracking items. A system for tracking an item is configured to scan the item for a computer readable code and convert the computer readable code into a digital identifier associated with the item. The system includes a controller circuit configured to receive authentication information from the mobile computing device, receive a request from the mobile computing device, comprising the digital identifier and a request for information relating to the item. When the memory has the information, the controller circuit obtains the information from the memory and generates an output comprising the digital identifier and the information for display. The output is based on a comparison of a location of the mobile computing device and an expected location of the item.

20 Claims, 9 Drawing Sheets

(56) References Cited

U.S. PATENT DOCUMENTS

| | | |
|---|---|---|
| 2018/0341904 A1 | 11/2018 | Aleman et al. |
| 2019/0152376 A1 | 5/2019 | Schwartz et al. |
| 2019/0168392 A1 | 6/2019 | Väin et al. |
| 2020/0005240 A1 | 1/2020 | Ko et al. |

* cited by examiner

SYSTEM AND METHOD FOR ITEM TRACKING

CROSS-REFERENCE TO RELATED APPLICATIONS

Any and all applications for which a foreign or domestic priority claim is identified in the Application Data Sheet as filed with the present application are hereby incorporated by reference under 37 C.F.R. § 1.57. The present application is a continuation of U.S. application Ser. No. 16/746,726, filed Jan. 17, 2020, which, in turn, claims the benefit of priority to U.S. Provisional Application No. 62/794,142, filed Jan. 18, 2019 and titled SYSTEM AND METHOD FOR ITEM TRACKING, which is incorporated by reference herein in its entirety for all purposes.

BACKGROUND

Field

This disclosure relates to a system and method for providing information regarding the routing of items or containers of items within a distribution and delivery system. Particularly, the system and methods disclosed are configured to provide pertinent delivery and status information for the items or containers to users within the distribution and delivery system so that the users may obtain the information in real-time.

Description of the Related Art

The delivery of items by a distribution system or network involves processing and handling each of the items being delivered. During such processing and handling, the items (or containers of items) may be misplaced or otherwise fall out of its processing path. In such circumstances, once the item or container falls out of the processing path, it may be difficult or time consuming to reintroduce the item or container back into the processing path. Generally, the item or container itself will not include its destination information or what processing has been completed on the item or container. Without this information being indicated on the item or container, a user that finds the item or container may be unable to quickly ascertain how or where to reintroduce the item or container into the processing path. Thus, systems and methods configured to generate and process such information are desired.

SUMMARY

Various implementations of methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the invention described herein includes a system for tracking an item. The system comprises a mobile computing device comprising a display and a capture device and configured to scan the item for a computer readable code and convert the computer readable code into a digital identifier associated with the item. The system further comprises a memory circuit configured to store information for the item associated with the digital identifier. The system also comprises a controller circuit configured to receive authentication information from the mobile computing device, receive a request from the mobile computing device, the request comprising the digital identifier and a request for first information relating to the item, and determine whether the mobile computing device is authenticated based on the authentication information. When the mobile computing device is authenticated, the controller circuit further determines whether the memory circuit contains the first information for the item. When the memory circuit does contain the first information, the controller circuit further obtain the first information from the memory circuit and generates an output comprising the digital identifier and the first information for display on the mobile computing device, wherein the output is configured based on a comparison of a location of the mobile computing device and an expected location of the item.

Another aspect of the invention described herein includes a method for tracking an item. The method comprises storing information for the item associated with the digital identifier in a memory circuit, scanning the item for a computer readable code, converting the computer readable code into a digital identifier associated with the item, receiving authentication information from a mobile computing device, receiving a request from the mobile computing device, the request comprising the digital identifier and a request for first information relating to the item, and determining whether the mobile computing device is authenticated based on the authentication information. When the mobile computing device is authenticated, the method further determines whether the memory circuit contains the first information for the item. When the memory circuit does contain the first information, the method further obtains the first information from the memory circuit and generates an output comprising the digital identifier and the first information for display on the mobile computing device, wherein the output is configured based on a comparison of a location of the mobile computing device and an expected location of the item.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
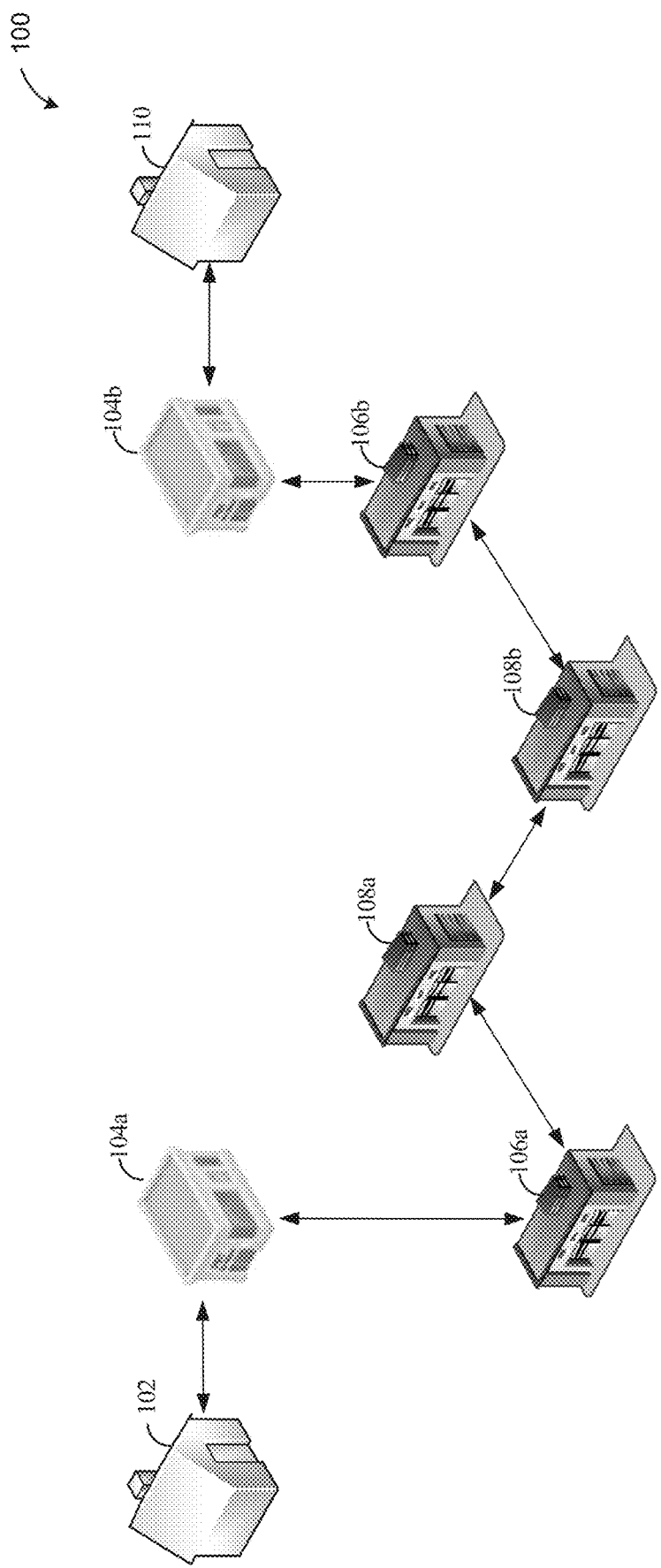
FIG. 1 depicts a diagram of one embodiment of an item distribution system used to distribute items between senders and recipients.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for providing real-time, pertinent delivery information for items that are part of the item delivery (or distribution) system. For example, the pertinent delivery information may relate to particular items, containers of items, trailers of items, or trays of items in the distribution system. The pertinent delivery information for the items may allow the distribution system track and/or analyze status of the items. Such tracking and/or analyzing of the status may include properly identifying an item and ensuring that the item is in a proper distribution path or that the item needs special attention. In some embodiments, the items may have or be associated with a label that includes a graphic or computer readable code, image, color, or the like that is unique to the label. Entities in the distribution system may scan the label (for example, with a barcode scanner, camera, or similar device) to check the status of the items associated with the label. Different types of items, or items at different stages in the distribution network may have a variety of computer readable codes thereon. The systems and methods described herein will allow the distribution system to identify item types, read multiple computer readable code formats, monitor, in real-time, delivery tracking of items at various stages or locations in the distribution system (for example, at Detached Mail Units (DMU) and/or Delivery Unit (DU) vestibule drops). As such, the distribution system will know what items are being delivered, where the items are in the distribution system, and how the items are being handled at any point in time in the distribution system. Additionally, the systems and methods described herein provide mobile diagnostic and label parsing tools that can provide reports or other updates or feedback to entities in the distribution system to improve efficiencies in the distribution system. Further details are provided below.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, trailers, vehicles, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network. The term "distribution system" may correspond to a collection of components that form a distribution network, as operated by a distribution entity. Accordingly, the terms "distribution system," "distribution network," and "distribution entity" may be used interchangeably to refer to the same or similar components or entities.

Additionally, as used herein, the term "resident" may refer to any individual or entity that resides, works, visits, or is associated with a physical delivery point. For example, as used herein, a person at his or her office is a resident, as is a student or teacher at a school. As used herein, a resident can be an entity capable of sending items from a delivery point and receiving items at a delivery point. Additionally, the term "residence" may refer to any building having an assigned physical delivery point, such as a house, an office building, an apartment, a factory, a school, etc. As used herein, a residence can be any location capable of being a destination for items within the distribution network or it can be a return delivery point for items in the distribution network.

For example, a distribution system, such as the United States Postal Service (USPS), or other shipping or item delivery service, may deliver items, such as letters, flats, parcels, packages, and bulky items to a plurality of delivery points or destinations. The USPS will be used in the present disclosure to describe some exemplary embodiments, but the present disclosure is not limited thereto. When referencing generically to any of the services listed above or any item distribution service in addition to those listed above, the phrase "item distribution service," "delivery service," or "distribution system" will be used to indicate such generalities.

The USPS delivers items, such as mail and packages, to various physical delivery points in the United States on a daily basis, Monday through Saturday. The USPS is tasked with providing secure, reliable, and affordable delivery of the items to every delivery point in the United States, U.S. territories, and U.S. military installations worldwide. For example, the USPS delivers more than 480 million items to over 150 million destinations or delivery points every day. In delivering the items to the delivery points, in the United States and worldwide, the USPS is in a unique position of having so many items entering into, transiting through, and exiting from its distribution system each day. Additionally, generally speaking, each item handled by the USPS has a deadline by which the item should be delivered to its destination. The USPS may provide status of the transporting (or distribution) of particular items to interested parties (for example, the sender and the recipient). Thus, the USPS is also in the unique position of having to track such a large quantity of items on a daily basis. Furthermore, as the delivery of items by the distribution system is often tied to the deadlines for the items, the USPS may route or handle different items differently and/or adjust the routing or handling of one or more items already in the distribution system. For example, based on a new item being deposited with the distribution system that has a more urgent deadline or whose deadline requires more urgent handling than the one or more items already in the distribution system, the distribution system may delay routing or handling of the one or more items already in the distribution system and instead route or handle the new item. Thus, the USPS may manage and monitor the distribution of each item in the distribution system in a dynamic manner while accounting for corresponding deadlines, instructions, and so forth while maintaining certain efficiencies.

In some embodiments, the USPS gathers information regarding the items being distributed while the distribution system is handling and routing the items within the USPS distribution network. In some embodiments, where items that are handled individually, the distribution system may gather information for the item itself. For items that are handled in aggregate with other items (for example, in a tray, container, trailer, and so forth), the distribution system may gather information for the tray, etc. Thus, at different times in the distribution system, items may be tracked individually or in aggregate. The USPS can also track destination and/or source information regarding the items being distributed through the USPS distribution network.

The systems and methods described herein may enhance visibility (for example, awareness of information regarding the items) using real-time scan data. The real-time aspect of relevant data allows the distribution system to determine when service performance is at risk (for example, when an item is at risk of missing a delivery deadline) and to identify opportunities for taking corrective action to reduce service performance risks and to provide efficiency gains before service failure (for example, the item missing its delivery deadline) occurs. The systems and methods enable visibility of the status and location of each item at all times, and enable automated mail processing and distribution decisions that can improve operational efficiencies and significantly reduce a quantity of service failures, thereby increasing service performance of the USPS. In item tracking, untimely (for example, non-real-time) information may create gaps in visibility for that item that may impedes the distribution network's ability to effectively track items as they move through the distribution system. The systems and methods described herein provide the real-time information that enables the USPS to augment item scanning and tracking information and enables interested parties to access visibility data in real-time. The USPS can use the real-time information to enhance various item tracking analytics and calculations, predictive workload planning, and revenue protection.

In some embodiments, the system and methods described herein may increase productivity for the distribution system. For example, the real-time tracking information provided by the systems and methods may enable cost-reducing efficiencies by enabling the distribution system, automatically and in real-time, to identify reasons for items being delayed (for example, arriving at a location late or departing a location late). For example, the distribution system may use the tracking information for an item to identify that the item was late arriving to a current facility because the item left a previous facility in a trailer on time but that the trailer was delayed arriving at the current facility due to traffic, and so forth.

FIG. 1 depicts a diagram of one embodiment of a distribution system 100 used to distribute items between shippers 102 and recipients 110. The distribution system 100 may be employed by an item delivery service to distribute items received and to be delivered across a geographic area. The distribution system 100 shows various distribution points or facilities. In some embodiments, the distribution system 100 may include more or fewer distribution points or facilities than shown in distribution system 100. For example, the distribution system 100 includes delivery units 104a and 104b (e.g., post offices or drop-off locations). The distribution system 100 may also include semi-regional facilities 106a and 106b (e.g., sectional center facilities) and regional facilities 108a and 108b (e.g., network distribution centers or distribution hubs). As described herein, items being delivered or distributing using the distribution system 100 may be tracked with respect to location in the distribution system 100, requested delivery date or time, and so forth.

The delivery units 104a and 104b may correspond to a facility that receives, sorts, and delivers items destined to recipients within a given geographic area. In the case of the USPS, the delivery units 104a and 104b may be associated with a region covered by a ZIP Code™ (a trademark of the USPS). In this role, the delivery units 104a and 104b may receive items from the semi-regional facility 106a that serves it. These items received from the semi-regional facilities 106a and 106b may be delivered by the delivery units 104a and 104b (e.g., via a mail carrier route, etc.) to the appropriate destination within a covered geographic area for the respective delivery unit 104a and 104b. Accordingly, the delivery units 104a and 104b may also sort and stage the items intended for delivery to destinations/recipients within the delivery unit's coverage area.

The delivery units 104a and 104b may also serve to receive and enter items into the distribution system 100. When serving as an intake facility, items that are received and entered into the distribution system 100 may be sent to the semi-regional facilities 106a and 106b. In some embodiments, the delivery units 104a and 104b may receive items from local shippers, from semi-regional facilities 106a and 106b, or regional facilities 108a and 108b. While the delivery unit 104a is shown as the intake facility, any of the semi-regional and regional facilities 106a and 106b and 108a and 108b, respectively, or other facilities not shown, may serve as the intake facility. The delivery units 104a and 104b may include equipment that can identify and track the movement of particular items or items in aggregate into, through, and from the delivery units 104a and 104b.

The semi-regional facilities 106a and 106b may receive and distribute items between multiple delivery units 104a and 104b and the associated regional facilities 108a and 108b. In the case of the USPS, the semi-regional facilities 106a and 106b may each be associated with a geographic region covered by the first three numbers of a ZIP code. The semi-regional facility 106a may serve as a processing and distribution center for the respective multiple delivery units 104a and 104b within its respective geographic areas. In some embodiments, the semi-regional facility 106a may receive items from the regional facility 108a for distribution to its respective delivery unit 104a. In some embodiments, the semi-regional facility 106a may receive items from its delivery unit 104a, for distribution to other delivery units 104b or the regional facility 108a. Similar to the delivery units 104a and 104b, the semi-regional facilities 106a and 106b may include equipment that can identify and track the movement of particular items or items in aggregate into, through, and from the semi-regional facilities 106a and 106b.

The regional facilities 108a and 108b may receive and distribute items between multiple semi-regional facilities 106a and 106b and other regional facilities. In the case of the USPS, the regional facility 108a may be associated with a region covered by a state or a group of states, etc. The regional facilities 108a and 108b may serve as processing and distribution centers for the respective multiple semi-regional facilities 106a and 106b within their respective geographic areas. In some embodiments, the regional facility 108a may receive items from the semi-regional facility 106a for distribution another semi-regional facility 106b that the regional facility 108a serves. In some embodiments, the regional facility 108a may receive items from its semi-regional facilities 106a and 106b for distribution to other regional facilities, e.g., the regional facility 108b. Similar to the delivery units 104a and 104b and the semi-regional facilities 106a and 106b, the regional facilities 108a and 108b may include equipment that can identify and track the movement of particular items or items in aggregate into, through, and from the regional facilities 108a and 108b.

When the item enters the distribution system 100 at the intake facility (e.g., regardless of delivery unit 104a, semi-regional facility 106a, and regional facility 108a), the item may be tracked through all sortation and distribution steps through which the item may pass. In some embodiments, such tracking may be individual to the item or be aggregate for volumes of items. The tracking may occur until the item is delivered to its destined recipient.

In some embodiments, the distribution system 100, as shown, may be a national distribution network that comprises multiple regional facilities 108a and 108b, multiple semi-regional facilities 106a and 106b, and multiple delivery units 104a and 104b, each having a defined coverage area, such as a geographic area and designated to receive and/or delivery items to/from recipients and senders in the geographic area. Furthermore, transportation of the items may occur between the shown units and facilities. For example, items that go between the delivery unit 104a and the semi-regional facility 106a may be transported by a carrier, for example in a trailer. The distribution system 100 may track which items (either individually or in aggregate with other items) are being transported between facilities or units in the distribution system 100, including when the items are in the carrier in transit, in the carrier at the destination facility or unit, in the carrier at the source facility or unit, and so forth.

As described herein, the distribution system 100 employed may comprise numerous pieces of equipment located in various facilities and at each level within the distribution system 100 (described and undescribed) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment may identify delivery point information that is printed on the item and reference stored information associated with the delivery point information to assist in the sorting and routing of the item.

Alternatively, or additionally, these pieces of equipment may identify recipient delivery point information and sort and route the item based on the identified recipient delivery point information. In some embodiments, different items being routed between the same locations may be routed differently based on a type of the item, postage of the item, size of the item, etc. For example, a first letter shipped from San Diego, CA, to Washington, D.C., with first class postage may be routed differently than a large package shipped between the two locations. Similarly, a second letter shipped with next day postage may be routed differently than the first letter shipped with first class postage. The variety of potential routes for different types of items or different postage services indicates the benefit of distributing a system throughout the distribution network, for example in multiple intake and unit delivery facilities, to maximize the amount of information gathered by the system to associate with residences and delivery points.

Figure 2:
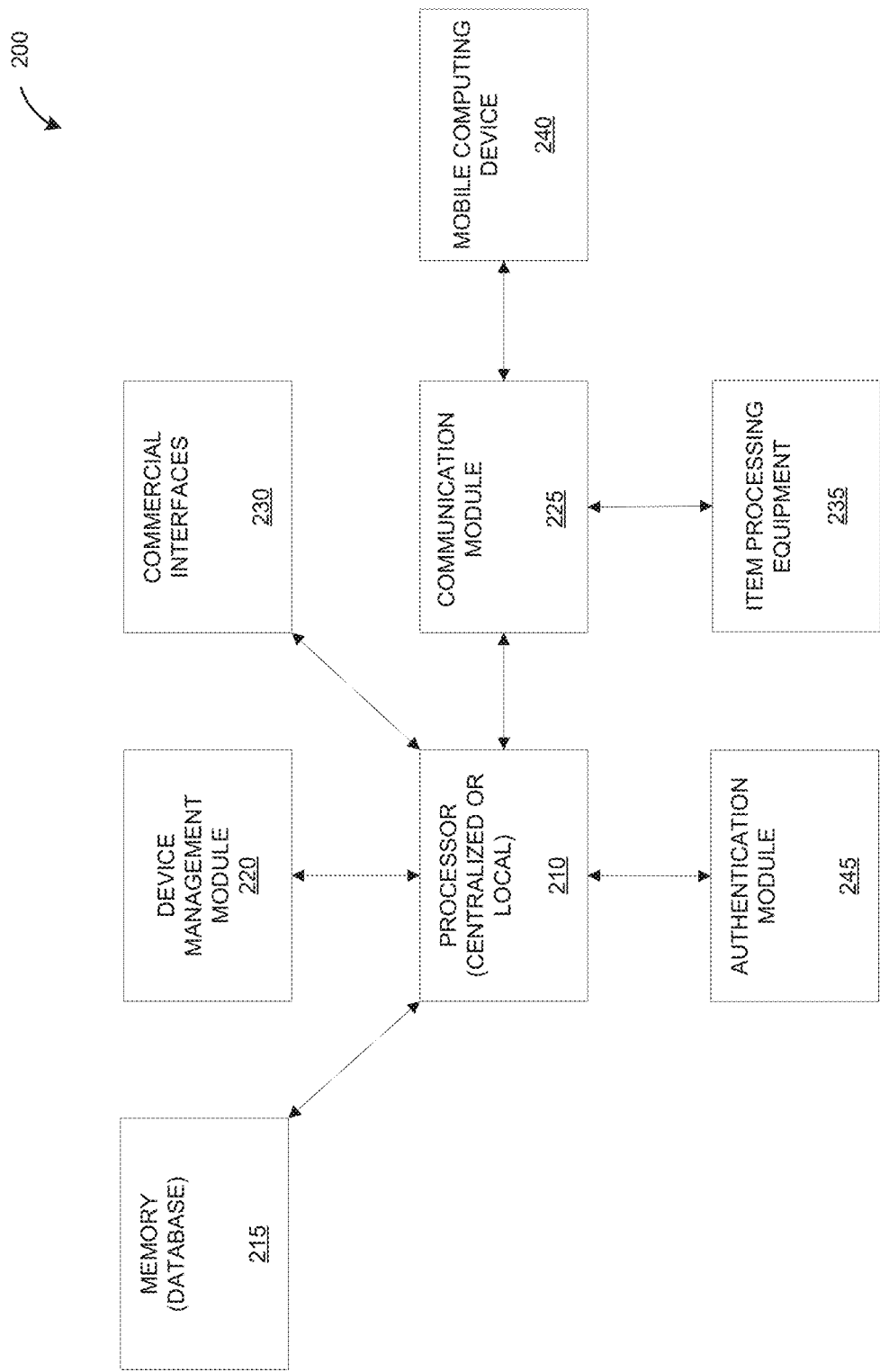
FIG. 2 depicts a block diagram of one embodiment of a control system that may be used in the item distribution system of FIG. 1.

FIG. 2 depicts a block diagram of one embodiment of a control system 200 that may be used in the item distribution system 100 of FIG. 1. The control system 200 may process item information to perform the item tracking and other analytics described herein. The control 200 comprises a processor 210, a memory 215, a device management module 220, a communication module 225, one or more commercial interfaces 230, a mobile computing device 240, an item processing equipment 235, and an authentication module 245. In some embodiments, the control system 200 may comprise more or fewer components than shown in FIG. 2, or one or more of the components may be combined with one or more other components.

In some embodiments, the control system 200 may be a distributed system. For example, the control system 200 may comprise one or more components that are centralized (e.g., the processor 210, the memory 215, the device management module 220, the communication module 225, the authentication module 245, and the commercial interfaces 230) with other components (for example, the mobile computing device 240 or the item processing equipment 235, with which the processor 210 is coupled via the communication module 225) distributed in various locations. In some embodiments, all of the components shown in the control system 200 are interconnected, for example, via the communication module 225. In some embodiments, more or fewer components may be distributed and/or centralized. When in a distributed system with centralized components, the centralized components may be configured to interact and communicate with the distributed components. For example, a regional facility may comprise a collection of mobile computing devices 240 or item processing equipment 235 that are each distributed and that each communicate with the central components (e.g., the processor 210, the memory 215, the communication module 225, or the device management module 220). Accordingly, when tracking item information, the distributed system 100 may funnel all item tracking and/or management functions to the centrally located processor 210.

In some embodiments, each piece of equipment that handles an item in the distribution system 100 may comprise the item processing equipment 235. In some embodiments, each item processing equipment 235 comprises one or more of the components of FIG. 2 (for example, the processor 210, the memory 215, the communication module 225, and so forth) that the item processing equipment 235 uses to perform processes associated with the item processing equipment, for example handling or routing of items in the distribution system 100. Accordingly, when handling or routing items, the item processing equipment 235 may locally perform one or more tracking or analytics processes or provide updates to the centralized processor 210 regarding status, location, etc., of the item.

For ease of discussion herein, the control system 200 will be described as a centralized system with various components integrated with one or more of the carriers, delivery units 104, semi-regional facilities 106, and regional facilities 108 as described herein. In some embodiments, the delivery units or facilities have their own control systems 200, where the individual memory 215 and processor 210 for each system corresponds to the specified geographic regions. In some embodiments, the multiple control systems 200 each comprising processors 210 may share a single memory 215. In some embodiments, the multiple control systems 200 each have individual memory 215 but all share a single processor 210. In some embodiments, the multiple delivery point information systems 200 each have individual memory 215 and individual processors but are still interconnected via one or more communications modules 225. Furthermore, the control system 200 will be discussed as having the centralized processor 210 and memory 215 in communication with distributed mobile computing devices 240 and item processing equipment 235.

The processor 210 can be embodied on a computer or a server which communicates (using the communication module 225) via a wired or wireless link to the memory 215 and modules of the control system 200. In some embodiments, all processing for the various modules of the control system 200 may be performed by the processor 210. In some embodiments, the processor 210 may comprise the processor of a piece of item processing equipment or a mail computing device. Accordingly, the processor 210 may be integrated within the equipment or device and may not perform or control any distributed functions or processing. Accordingly, each individual piece of equipment or device may perform any necessary decrypting or encrypting processes locally. In some embodiments, the processor 210 may be configured to process information received from any of the components to which it is coupled. In some embodiments, the processor 210 may run software or programs stored in the memory 215 or received from any of the components of the control system 200.

The memory 215 is in communication with the processor 210, and (via the processor 210) the communication module 225, the authentication module 245, the commercial interfaces 230, the mobile computing device 240 (via the communication module 225), and the item processing equipment 235 (also via the communication module 225). The memory 215 can store data and information relating to the items being tracked. For example, the memory 215 may include sender (or source) information, recipient (or destination) information, route information, current location information for each item being tracked (for example, identifying a location in the route of the item), and so forth. In some embodiments, the memory 215 may include a database of item tracking information, such as delay information, deadline for delivery, whether the item is being transported in aggregate, expected delivery date, and so forth. In some embodiments, some items may not be individually tracked but rather tracked based on belonging to an aggregate of items (for example, flyers for a particular area or non-package items mailed via First Class mail. The memory 215 can also store the operating instructions for the components of the control system 200. In some embodiments, the memory 215 may comprise an individual computing system configured to store information, the computing system having its own processor and communication modules. In some embodiments, the memory 215 may be a local memory of the item processing equipment 235 or the mobile computing device 240. When the memory 215 is local to the item processing equipment 235 or the mobile computing device 240, the memory 215 may store operating instructions for the equipment or computing device.

The commercial interface 230 may comprise an interface through which users (e.g., customers, third party shippers, etc.) can request or view status updates for items they are expecting or have sent. The commercial information may access item information (as available) from the memory 215 to provide information regarding the item's current location, estimated delivery date, sender information, recipient information, and so forth. In some embodiments, the commercial interface 230 may comprise a computer system, a processor, software running on the processor 210, a website or portal operated by an external system, or the like. In some embodiments, the commercial interface 230 may be integrated with one or more other modules of the control system 200, such as the authentication module 245 or the memory 215 or the processor 210. In some embodiments, the commercial interface 230 may allow the user to view and manage various parameters of their item, for example changing the recipient information or requested delivery date. For example, the customer may request a status update on a birthday gift being transported. In response to the request for the status update, the processor 210 may access the memory 215 to identify the current location and an expected delivery date for the item. The customer may then delay the item or pay extra to have the item further expedited.

The communication module 225 comprises a module that allows any component of the control system 200 to communicate with one or more devices and modules external to the control system 200. For example, the communication module 225 may provide wireless or wired communication capabilities with a communication module 225 of another delivery point information system 200 or with the user described herein. The communications with the user may be via the Internet or a similar network type connection. The communication module 225 may receive communications from users, for example, requests and queries for item status. The communication module 225 may also transmit the results of the requests and queries to the requesting user. In some embodiments, for example when one or more of the components of the system are distributed, the communication module 225 may also communicate with other components of the control system 200.

Similarly, communication modules 225 may provide for communication between any other components that are remote from each other. Accordingly, the communication module 225 may be configured to provide communications for each of the components of the control system 200. The communication module 225 may also be configured to allow the modules of the control system 200 to access external resources, such as the Internet or a local network, etc.

The item processing equipment 235 may comprise equipment that the control system 200 uses to scan, identify, sort, route, and otherwise distribute items from their respective sources to their respective destinations or recipients. In some embodiments, the item processing equipment 235 may comprise sensors, cameras, and a computer or a processor or software running on the processor 210, or the like. Using its various sensors, the item processing equipment 235 may identify label or other tracking information on an item being handled by the item processing equipment 235 and update a memory location for the item with a location of the item processing equipment 235, any delays experienced, and so forth.

In some embodiments, the item processing equipment 235 may be integrated with one or more other components of the control system 200. The item processing equipment 235 may be configured to receive one or more signals from one or more sensors, cameras, connections with sensors or connections with cameras or other input devices configured to identify and capture physical attributes of the item. The signals received by the item processing equipment 235 may include inputs or signals comprising, for example, scans of written or printed delivery point information, scans of barcodes (e.g., an Intelligent Mail Barcode® (IMb™, a trademark of the USPS)) that is printed on the item, a mass or weight of the item, dimensions of the item, shape of the item, or physical markings on the item (such as a logo or description of the contents or a decorative bow or wrapping paper or infrared (or other non-visible) markings). In some embodiments, the item processing equipment 235 may be configured to communicate the received inputs or signals to any of the other components of the control system 200.

The one or more mobile computing devices 240 may comprise a mobile device (for example, a cell phone or a PDA), a computer, a processor, software running on the processor 210, or the like. In some embodiments, the one or more mobile computing devices 240 may be integrated with one or more other modules of the control system 200. The one or more mobile computing devices 240 may represent input mechanisms or modules allowing the mail carrier or other entity of the distribution system 100 handling the item to provide input to the control system 200. In some embodiments, the one or more mobile computing devices 240 may include a camera or other image or multimedia capturing functionality (e.g., barcode capture capability) such that a carrier manually handling the item comprising the label or other tracking information may be able to access records associated with the item to identify, for example, where the item is supposed to be, when the item is to be delivered, sender information, recipient information, and so forth. In some embodiments, the mobile computing devices 240 may further include text input capabilities (such as a physical or touchscreen keyboard), such that the carrier may input descriptions or various text phrases (for example, reasons for a delay, issues identified, special instructions, and so forth) into the control system 200. In some embodiments, the mobile computing device 240 may comprise multiple pieces of hardware (for example a camera and a PDA) or may be integrated into a single piece of hardware (for example, a smartphone, a tablet, a computer, a mobile delivery device (MDD) or a tablet computer, etc.).

The authentication module 245 may authenticate users and entities that attempt to access item tracking records and so forth via the control system 200. For example, the control system 200 may only provide the item information to the sender or recipient or to operators (for example, carriers, etc.) of the distribution system 100. Thus, the sender and receiver may have to register and provide authentication information to confirm they should have access to item information. The same may apply to the operators of the distribution system 100. The authentication module 245 may authenticate users via any known means, for example, user names and passwords, randomized unique identifiers, etc. Once the use is authenticated by the authentication module 245 (for example, via the commercial interface 230), the user may be allowed to request, manage, or view item information.

In some embodiments, the control system 200 may be implemented or incorporated at one or more levels of the distribution system 100 described herein, such as in the delivery unit 104, the semi-regional facility 106, or the regional facility 108. In some embodiments, various equipment from any of these facilities may comprise the item processing equipment 235. In some embodiments, equipment from the facilities may be coupled to and/or integrated with the control system 200. For example, routing and sorting equipment at any of the distribution points of the distribution system 100 may communicate or be integrated with the control system when routing or sorting items. In some embodiments, one or more pieces of the sorting and routing equipment may comprise one or more components of the control system 200 (e.g., the memory 215 and the processor 210) so that tracking information can be updated locally in real-time without any need for external communications.

The distribution system 100 uses mobile scanning technology to monitor performance and tracking of items through the distribution system 100. The distribution system 100 may include several technologies to assist in item tracking and improved efficiencies. However, gaps exist where items (for example, including containers and trailers) are not being scanned because of the lack of the available software.

Mobile devices, for example the mobile computing devices 240, are reshaping the way decisions are made in systems by providing a flexible solution to gathering and accessing business intelligence information for operators of the distribution system 100. When integrated with the distribution system 100 and/or the control system 200, the mobile computing devices 240 may provide actionable critical data at the operator's fingertips and provide an ability to interact with that data to drive and/or derive business value. In some embodiments, the mobile computing devices 240 aid operators with prioritizing/assessing items based on a service standard and commitment date for the items.

The control system 200 may use a color code policy for items to ensure timely processing, dispatch, and delivery of the items within established service standards (for example, deadlines). For example, the control system 200 may apply a color code tag to items to track and/or monitor a delivery date commitment until the item is delivered. The color code tag may be determined and applied based on interpretation/analysis of corresponding business rules. In some embodiments, the control system 200 determines the mail commitment data and color code requirement when a label is scanned. Automating item prioritization will increase productivity and improve customer service by reducing service failures.

In some embodiments, the control system 200 is unable to perform predictive workload planning or deadline calculations without item history and/or barcode diagnostic applications, described in more detail below.

The control system 200 may fill visibility gaps by implementing item nesting tracking, trailer departure event scans, Global Positioning System (GPS) breadcrumb data collection/tracking, geo fencing of trailer departure, and the association of this data to the distribution system route portions.

In some embodiments, the systems and methods described herein may provide predictive workload planning of items, improve operational efficiency, increase the transparency of mail through enhanced tracking, improve the customer experience, improve mail inventory and transportation performance metrics, allow for quality checks to be performed which prevent errors, improves security, and avoid unsafe conditions, and will help provide more precise information regarding the system assets.

Providing operators of the distribution system 100 with mobile accessible diagnostic tools to help them with normal day to day activities will improve system efficiency. As described in more detail below, the diagnostic tools include an item history application and an enhanced parsing tool which performs parsing and barcode analysis for all barcode types. The barcode analysis functionality will be available for the human readable data strings of barcodes or the visible elements of the barcodes. For example, invalid data elements will be highlighted on the mobile device for processing. These elements include, among others, barcode symbology and syntax, function 1, Service Type Code (STC), Service Type Identifier (STID), Mailer Identification (MID), ZIP codes, Stop, Start, and mod check digit.

Figure 3:
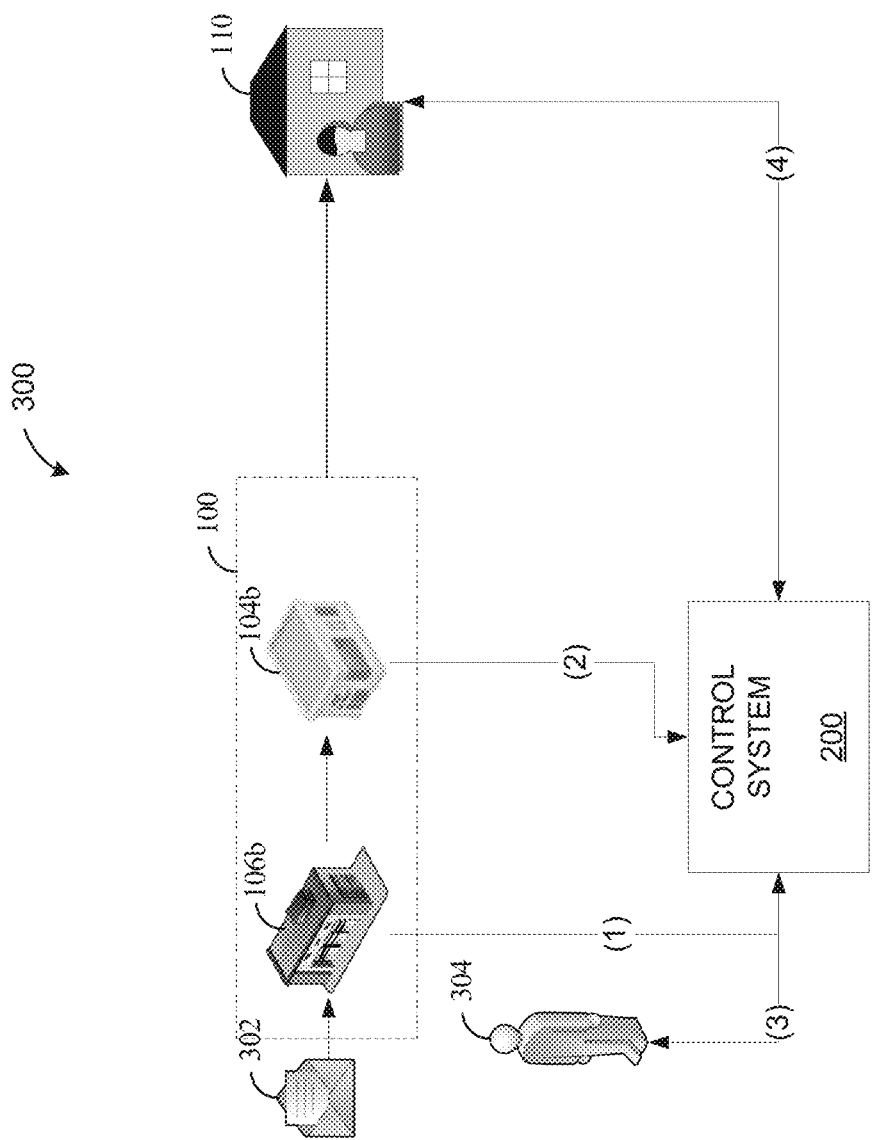
FIG. 3 depicts an example data flow diagram of an item being distributed by the distribution system of FIG. 1.

FIG. 3 depicts an example data flow diagram 300 of an item being distributed by the distribution system 100 of FIG. 1. As shown, an item 302 is being handled by the distribution system 100 for delivery to the recipient 110. The distribution of the item 302 by the distribution service 100 begins, as shown, with the item 302 being received by the semi-regional facility 106b. The item 302 progresses from the semi-regional facility 106b to the delivery unit 104b and then to the recipient 110.

Each of the semi-regional facility 106b, the delivery unit 104b, the recipient 110, and an operator 304 of the distribution system 100 are shown communicating with the control system 200. The communications from the semi-regional facility 106b and the delivery unit 104b may be updates to records in the memory 215 of the control system 200 to update location information for the item 302. Only one item is depicted here, for ease of discussion. However, a person of skill in the art will understand that the item can be a plurality of items and/or can be items of various types, without departing from the scope of this disclosure.

For example, when the semi-regional facility 106b receives the item 302, the semi-regional facility 106b (for example, via a local processor or controller, not shown here) may, at (1), communicate tracking information for the item 302 (for example, individually or in aggregate). The tracking information may include the location of the item 302 as the location of the semi-regional facility 106b. In some embodiments, the tracking information includes details of a particular item processing equipment 135 of the semi-regional facility 106b. In some embodiments, the semi-regional facility 106b may also provide updates of delays, expected delivery dates, and the like. Similarly, when the delivery unit 104b receives the item 302, the delivery unit 104b (for example, via a local processor or controller, not shown here) may, at (2), communicate tracking information for the item 302 (for example, individually or in aggregate) to the control system 200. The tracking information may include the location of the item 302 as the location of the delivery unit 104b. In some embodiments, the tracking information includes details of a particular item processing equipment 135 of the delivery unit 104b. In some embodiments, the delivery unit 104b may also provide updates of delays, expected delivery dates, and the like.

At (3), the operator 304 of the distribution system 100 may scan a label of the item 302 and obtain information about the item 302. The operator 304 may use one of the mobile computing devices 240 of FIG. 2 and may have to log-in or provide other authentication information to gain access to the information about the item 302. Once authenticated, the control system 200 may provide the operator 304 with status information of the item 302. Thus, the control system 200 may provide the operator 304 with the location information for the item 302 from the stored information in the memory 215 of the control system 200. Thus, if the location information in the memory 215 is updated to match the semi-regional facility 106b after the semi-regional facility 106b communicates the information in (1), then the operator or operators 304 will see that the item 302 is in the semi-regional facility 106b. In some embodiments, the operator 304 may also access and/or modify delay information for the item 302 or estimated delivery date information.

At (4), the recipient 110 may enter tracking information for the item 302 to obtain information about the item 302. The recipient 110 may use one of the mobile computing devices 240 of FIG. 2 or any other computing device and may have to log-in or provide other authentication information to gain access to the information about the item 302. Once authenticated, the control system 200 may provide the recipient 110 with status information of the item 302. Thus, the control system 200 may provide the recipient 110 with the location information for the item 302 from the stored information in the memory 215 of the control system 200. Thus, if the location information in the memory 215 is updated to match the delivery unit 104b after the delivery unit 104b communicates the information in (2), then the recipient 110 will see that the item 302 is in the delivery unit 104b. In some embodiments, the recipient may also access and/or modify recipient information for the item 302 or a requested delivery date.

In some embodiments, the operator 304 of FIG. 3 may work in a facility or unit of the distribution system 100. In some embodiments, the operator 304 may manage operations in the facility or unit or may be tasked with working with items in the facility or unit (for example, as a carrier that delivers items or otherwise works with items in the facility or unit). In some embodiments, the operator 304 (or a plurality or subset thereof) may use one or more mobile computing devices 240. When the corresponding operator 304 is authenticated via the authentication module 245, the operator 304 may use the mobile computing device 240 to help manage mail items in the distribution system 100.

In some embodiments, the operators 304 using the mobile computing devices 240 may access one or more applications or programs operating on the mobile computing devices 240. For example, the operators 304 use an item history application or a barcode diagnostics application to obtain information regarding the item.

The operators 304 may use the item history application to receive automated, real-time pertinent delivery information for any container, tray, item, etc., label to determine the mail commitment date (for example, deadline to delivery) and color-coding requirement for accurate processing and/or distribution of the container, tray, item, etc. The item history application may allow for automated item prioritization, which can increase productivity and efficiency and improve customer service by reducing a number of service failures. The operators 304 may use mobile computing devices 240 to scan containers, trays, item handling units, and single pieces/packages (for example, scanning corresponding labels, etc.) to retrieve the pertinent delivery information and the status of corresponding pieces (for example, in a color code format) for processing and/or distribution. In some embodiments, the operators 304 enter barcode or label information, such as by scanning, imaging, manually, and the like, using the camera or scanner or another input device on the mobile computing device 240.

Figure 4:
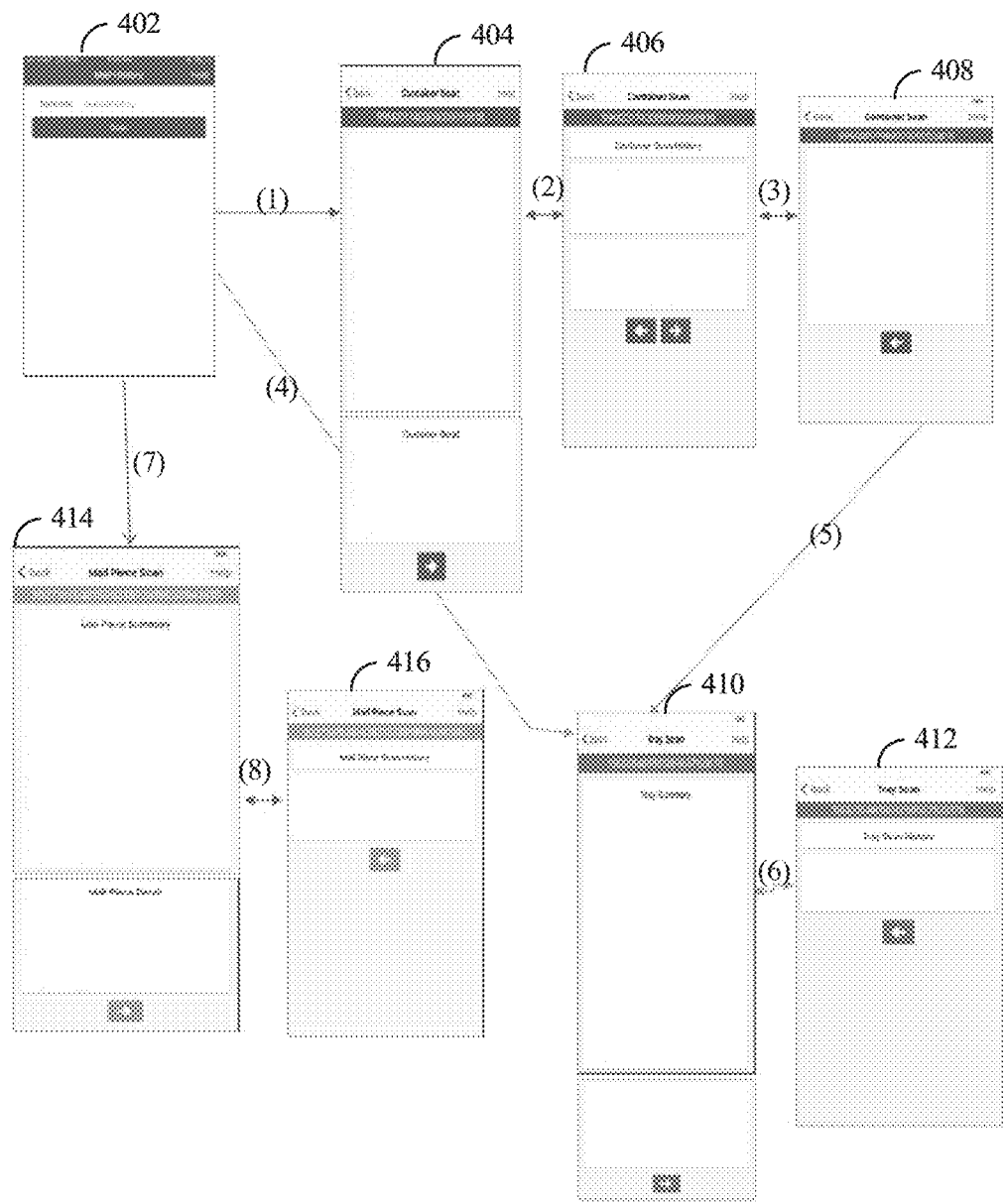
FIG. 4 is a data flow diagram for the item history application used by the operator of FIG. 3 from the distribution system of FIG. 1, for example on the mobile computing device of FIG. 2.

FIG. 4 is an example flow diagram of the item history application as used by the operator 304. FIG. 4 is a data flow diagram 400 for the item history application used by the operator 304 of FIG. 3 from the distribution system 100 of FIG. 1, for example on the mobile computing device 240 of FIG. 2. The screen 402 allows the operator 304 to use a scanner or camera of the mobile computing device 240 to scan or manually enter a barcode or other computer readable code (hereinafter, barcode) that is uniquely associated with an item. If the entered or scanned barcode is associated with a container, then the data flow follows (1) to provide summary information associated with the scanned container. If the entered or scanned barcode is associated with a tray, sack, bundle, etc., (hereinafter, tray) then the data flow follows (4) to provide summary information associated with the scanned tray. If the entered or scanned barcode is associated with a letter, flat, or package (hereinafter, letter), then the data flow follows (7) to provide summary information associated with the scanned letter.

Screen 404 shows the summary information for the scanned container. The screen 404 includes, among other information, the scanned or entered container barcode, item class for the container, color code, earliest expected delivery date, items contained in the container (trays and individual mail pieces) and recent scan information. In some embodiments, the recent scan information is based on the scan performed by the operator 304 to view the summary information. In some embodiments, the recent scan information is the scan information from a most recent, previous scan. The operator 304 can use navigation buttons on the mobile computing device 240 to view different screens 406 and/or 408. For example, the operator can navigate, via (3) to the screen 406 and via (4) to the screen 408. On the screen 406, the operator 304 can review scan history for the container, which may allow the operator 304 to track the route for the container to a present location. On the screen 408, the operator may view label details for the trays in the container. For example, the screen 408 shows barcode or label information for the six trays that are in the container. In some embodiments, the operator 304 selects one of the trays to view summary information for the selected tray, via (5). In some embodiments, the item history application can also provide label or barcode details for individual packages in the container (for example, items that have their own barcodes, not shown in this figure). As such, the operator 304 can view summary information for the items in the container by selecting a particular item.

Screen 410 shows the summary information for the scanned tray (for example, via (4)) or selected tray (for example, via (5)). The screen 410 includes, among other information, the scanned or entered tray barcode, mail class for the tray, color code, earliest expected delivery date, and recent scan information. In some embodiments, the recent scan information is based on the scan performed by the operator 304 to view the summary information. In some embodiments, the recent scan information is the scan information from a most recent, previous scan. The operator 304 can use navigation buttons on the mobile computing device 240 to view different screen 412. For example, the operator can navigate, via (6) to the screen 412. On the screen 412, the operator 304 can review scan history for the tray, which may allow the operator 304 to track the route for the tray to a present location. Though not shown in this figure, the operator 304 may view label details for the items in the tray, if the items in the tray have individual identifiers. In some embodiments, the operator 304 selects one of the identifiers to view summary information for the selected item.

Screen 414 shows the summary information for the scanned item (for example, via (7)) or selected item. The screen 414 includes, among other information, the scanned or entered item barcode, mail class for the item, color code, earliest expected delivery date, and recent scan information, such as scan history. In some embodiments, the recent scan information is based on the scan performed by the operator 304 to view the summary information. In some embodiments, the recent scan information is the scan information from a most recent, previous scan. The operator 304 can use navigation buttons on the mobile computing device 240 to view different screen 416. For example, the operator can navigate, via (8) to the screen 416. On the screen 416, the operator 304 can review scan history for the item, which may allow the operator 304 to track the route for the item to a present location.

The item history application may provide different warnings or messages based on the barcode scanned or entered. For example, when the operator 304 scans or enters a barcode (for example, at screen 402) that is not found in the memory 215 of the control system 200 or the distribution system 100. In such a scenario, the item history application may display a message that the barcode is not found in the control system 200 and allow the operator 304 to view the scanned or input barcode and re-enter or rescan the barcode. In this scenario, the control system 200 may be unable to find any data corresponding to the scanned or entered barcode or that the control system 200 is unable to find the scanned or entered barcode. When the operator 304 scans or enters a barcode (for example, at screen 402) that is invalid (for example, not properly formatted, has a bad not check value (for example, checksum, and so forth), and so forth), the item history application may display a message that the barcode is invalid and allow the operator 304 to view the scanned or input barcode and re-enter or rescan the barcode. When the operator 304 scans or enters a barcode (for example, at screen 402) that is not supported (for example, not one of the supported types of barcodes), the item history application may display a message that the barcode is unsupported and allow the operator 304 to view the scanned or input barcode and re-enter or rescan the barcode. In some embodiments, the mobile computing device 240 may provide messages for lack of connectivity, service errors, invalid responses, service timeouts, and similar scenarios.

In some embodiments, the operator 304 can use the mobile computing device 240 to view previously scanned barcodes. Additionally, the screens 402-416 may be color coded dependent on the type of barcode the screens are associated with. For example, when the scanned or entered barcode relates to a container, then the screens may be colored (for example, a title bar, etc.) blue, while tray barcodes may provide green screens, and item barcodes may provide orange or yellow screens.

In some embodiments, the following barcodes are supported by the item history application:
  Pieces (Letters/Flats)
  Intelligent Mail barcode (IMb) (pIMb, rIMb)
  Universal Postal Union Standard S10 (UPU S10)
  Flats ID Code Sort (FICs)
  IMI Indicia barcode—All formats of IMI (IMI-STD, IMI-MAX or IMI-MIN)
  IBI Indicia barcode
  International 29-character bag tag
  Packages
  Intelligent Mail package barcode (IMpb)—All 4 lengths (22, 26, 30, 34)
  Handling Units (Tray/Tubs/Sacks)
  Intelligent Mail tray barcode (IMtb/IMtl)
  Generic Surface Label (USPS-L-3174)
  Dispatch & Routing Surface Label (USPS-L-3171)—Surface Transport Tag Dispatch & Routing Assignment Label (USPS-L-3170)/
FedEx Air Assignment Label (USPS-L-3181)/D&R Air Assignment Inter-Contract FedEx Label (USPS-L-3208)

Containers

Intelligent Mail Container Barcode (IMcb) (99M)

MTEL (99H, 99S, 99P, 99Q) Code 128 and 2D DataMatrix

The operator 304 may also use the mobile computing device 240 to operate a barcode diagnostics application, or it may be part of the item history application. The barcode diagnostics application and/or item history application may provide the operator 304 with barcode analysis of elements of scanned item barcodes. The barcode diagnostics application may include a barcode parsing tool that highlights on the screen of the mobile computing device 240, such as in an overlay of an image of the scanned barcode, invalid data elements related to the scanned barcode. The barcode parsing tool may parse the barcode and provide a symbology, type, data elements per barcode specification, and known syntax errors of the scanned or entered barcode. "Symbology" may comprise the barcode "language" that is used to create the barcode.

For example, the barcode diagnostics application may cause the mobile computing device 240 to identify an invalid barcode length or symbology for a scanned or entered barcode to help the operator 304 to more efficiently process items. Thus, the operator 304 may use the barcode diagnostic application to identify issues with barcodes and to provide information to the system about the scanned or entered barcode.

Figure 5:
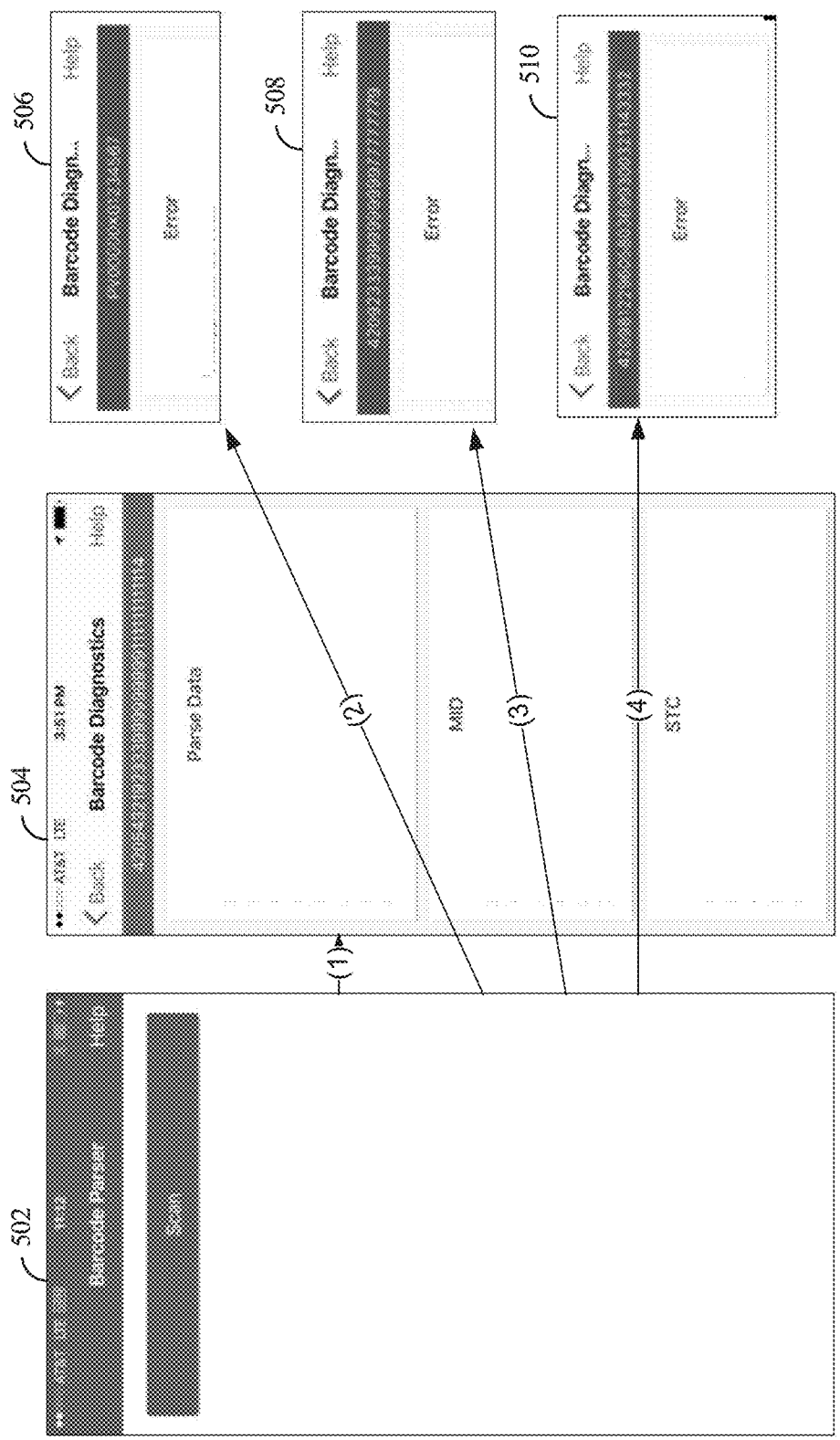
FIG. 5 is a data flow diagram for the barcode diagnostics application used by the operator of FIG. 3 from the distribution system of FIG. 1, for example on the mobile computing device of FIG. 2.

FIG. 5 is a data flow diagram 500 for the barcode diagnostics application used by the operator 304 of FIG. 3 from the distribution system 100 of FIG. 1, for example on the mobile computing device 240 of FIG. 2. The screen 502 allows the operator 304 to use a scanner or camera of the mobile computing device 240 to scan or manually enter a barcode or other computer readable code (hereinafter, barcode) that is uniquely associated with an item. If the entered or scanned barcode is a valid, supported barcode, then the data flow follows (1) to screen 504 that provides information associated with the scanned or entered barcode. For example, the barcode diagnostics application may parse the barcode and provide details of the entered or scanned. The parsed detail may include, among other information, a mailer identifier, service type codes, and service type identifiers.

If the entered or scanned barcode is an unsupported barcode, then the data flow follows (2) to screen 506, which shows an error message for an unsupported barcode with the entered or scanned barcode displayed. If the entered or scanned barcode has an invalid checksum, then the data flow follows (3) to screen 508, which shows an error message for the invalid checksum with the entered or scanned barcode displayed. If the entered or scanned barcode has an improper or incorrect application identifier, then the data flow follows (4) to screen 510, which shows an error message for an incorrect or unsupported application identifier with the entered or scanned barcode displayed. In some embodiments, the recent scan information is based on the scan performed by the operator 304 to view the summary information. In some embodiments, the recent scan information is the scan information from a most recent, previous scan. The operator 304 can use navigation buttons on the mobile computing device 240 to view the scan history of screen 512.

The barcode diagnostics application may provide different warnings or messages based on the barcode scanned or entered. For example, when the operator 304 scans or enters a barcode (for example, at screen 502) that is not found in the memory 215 of the control system 200 or the distribution system 100. In such a scenario, the barcode diagnostics application may display a message that the barcode is not found in the control system 200 and allow the operator 304 to view the scanned or input barcode and re-enter or rescan the barcode. In this scenario, the control system 200 may be unable to find any data corresponding to the scanned or entered barcode or that the control system 200 is unable to find the scanned or entered barcode. When the operator 304 scans or enters a barcode (for example, at screen 502) that is bad, the barcode diagnostics application may display a message and allow the operator 304 to view the scanned or input barcode and re-enter or rescan the barcode. In some embodiments, the mobile computing device 240 may provide messages for lack of connectivity, service errors, invalid responses, service timeouts, and similar scenarios, similar to the item history application above.

In some embodiments, the following barcodes are supported by the barcode diagnostic application:

Pieces (Letters/Flats)

Intelligent Mail barcode (IMb) (pIMb, rIMb)

Universal Postal Union Standard S10 (UPU S10)

Flats ID Code Sort (FICs)

IMI Indicia barcode—All formats of IMI (IMI-STD, IMI-MAX or IMI-MIN)

IBI Indicia barcode

International 29-character bag tag

Packages

Intelligent Mail package barcode (IMpb)—All 4 lengths (22, 26, 30, 34)

Handling Units (Tray/Tubs/Sacks)

Intelligent Mail tray barcode (IMtb/IMtl)

Generic Surface Label (USPS-L-3174)

Dispatch & Routing Surface Label (USPS-L-3171)—Surface Transport Tag

Dispatch & Routing Assignment Label (USPS-L-3170)/FedEx Air Assignment Label (USPS-L-3181)/D&R Air Assignment Inter-Contract FedEx Label (USPS-L-3208)

Containers

Intelligent Mail Container Barcode (IMcb) (99M)

MTEL (99H, 99S, 99P, 99Q) Code 128 and 2D DataMatrix

Trailers

Trailer (99T/99V)

Miscellaneous

Driver/USPS Employee Badge

Managed Service Point (MSP)

In some embodiments, the item history application and the barcode diagnostics application may allow the operator 304 to manage items, prioritize items, identify disposition of items, find specific mailer identifiers, obtain information about items, identify looped items, and/or determine when, where, and what mobile computing device 240 scanned an item.

As described herein, the barcode (for example, the computer readable code) corresponds to an identifier. Each unique barcode may be associated with a unique identifier. Furthermore, each barcode may correspond to or belong to a particular type of barcode. For example, the barcodes can be a linear one-dimensional barcode, a type of postal barcode, a two dimensional barcode, and so forth. However, the item history and the barcode diagnostics applications may identify the barcode type based on the image of the barcode captured by the camera or image capture device. The applications may be able to identify the type of barcode of the scanned or imaged barcode. Based on the identified type of barcode, the applications may determine how to decode the barcode into the corresponding identifier. For example, the barcode is determined to be an IMb-type barcode based on identifying the state lines, e.g., the four state lines of an IMb. The barcode diagnostic application can identify that the scanned barcode contains rising, falling, full, and track (short) bars. The barcode diagnostic application can also determine an approximate length of the barcode, in order to determine whether it is the correct or expected length. The IMb has 65 bars, so the barcode application can count the number of bars to determine a valid barcode.

In some embodiments, the barcode application can identify the length of a barcode, or the number of bars in the barcode to determine which type the barcode is. For example, based on the type of bars and the number of bars and the length of the barcode, the barcode diagnostics application can determine whether a barcode is an IMpb having 22, 24, 30, or 34 digits, or whether it is any other type of barcode.

These processes for identifying the barcode can occur prior to decoding or reading the encoded digits of the barcodes. Once the barcode type is determined, the code can be sent to the proper database for decoding and lookup of the associated record. In some embodiments, the barcode diagnostic application can receive decoding instructions, or the encoding system for the barcode type it has identified. The barcode diagnostic application can then decode the barcode, and the barcode diagnostic application can send the decoded message to the database for the type of barcode. In some embodiments, the barcode diagnostic application will provide a signal, such as a visual depiction or information, of the type of barcode on the screen of the mobile computing device 240, which can include a color assigned to the identified type of barcode.

In some embodiments, the applications may be configured to decode as much of a barcode as possible and provide the decoded information to the user. For example, barcodes on items may be damaged, smeared, or otherwise distorted in a manner that makes them difficult or impossible to fully parse by the applications. Though the applications may not be able to identify the entire identifier corresponding to the damaged barcode, the applications may parse as much of the barcode as possible and use the parsed portion(s) of the barcode to identify as much information as possible associated with the barcode. In some embodiments, the applications may use information regarding the item being scanned (for example, a location of the item and/or the route associated with the item's distribution) in conjunction with the parsed portion(s) of the barcode to predict the identifier of the item. The predicted identifier can then be used to obtain the corresponding information for the application being used by the operator 304. In some embodiments, the portions of the information based on the prediction may be indicated differently from the portions of the information that were able to be parsed from the barcode. For example, the predicted portions may be highlighted, underlined, or similarly marked. For example, the last three digits of an IMb may not be able to be read or scanned by the operator 304 or the mobile computing device 240. However, based on the scanned or entered first 28 digits of the IMb and the location of the mobile computing device 240 in Michigan when the item was scanned, the control system 200 may predict the last three digits and provide the operator 304 with the information for the 31-digit IMb, highlighting any information specific to the predicted last three digits.

In some embodiments, the processor 210 is configured to limit processing of barcodes based on the type of barcode identified. For example, various barcodes may exist on the item (for example, universal product codes (UPCs) on purchased packaging, inventory barcodes, and so forth). The processor 210 may determine that certain types of barcodes that are scanned or otherwise captured or entered by an operator 304 can be ignored because they are not relevant to distribution of the item by the distribution system 100. For example, if the operator is using the item history application and the scanned or entered barcode is determined to not be one of the barcodes identified above that are compatible with the item history application, then the processor 210 may avoid any additional processing for that barcode and ignore it. This may allow the processor 210 to avoid processing irrelevant barcodes and improve efficiencies of the distribution system 100.

In some embodiments, the control system 200 may comprise one or more databases for each barcode type. For example, Intelligent Mail Barcodes may have one or more dedicated databases while Universal Postal Union Standard S10 have a different dedicated database. By having different databases for different barcode types, the control system 200 may streamline processing by only searching specific databases based on the barcode type. Thus, the control system 200 may reduce overall processing by minimizing unnecessary searches and/or limiting searches and look-ups based on the known barcode type. For example, when the databases are not separated by barcode type, or when each barcode type has corresponding information found in a separate database, the control system 200 may have to search through the mixed database, or may have to query multiple databases to find the information associated with a particular database, resulting in a longer or more resource intensive search process as opposed to only searching through barcodes of the known barcode type or through only the database corresponding to the particular barcode.

In an example use case, the operators 304 of the distribution system 100 use the item history and barcode diagnostic applications to scan an item, tray, or container label to be able to properly color code (prioritize and distribute) the items. This will not only increase productivity, but will improve customer service by reducing the amount of service failures by ensuring the timely processing, dispatch, and delivery of items within established service standards.

In another example use case, the operators 304 of the distribution system 100 use the item history and barcode diagnostics applications to scan an item and receive instant pertinent delivery information for the item. This information may allow the operators 300 to be able to properly prioritize/assess items based on a corresponding service standard and commitment date. This will not only increase productivity, but will improve customer service by reducing the amount of service failures by ensuring the timely processing, dispatch, and delivery of items within corresponding established service standards.

In another example use case, the operators 304 of the distribution system 100 scan and nest barcoded placards of containers to trailer barcodes of items being processed and transported to distribution system 100 facilities. In addition, this information provides the operators 304 with an ability to associate these containers and trailers to a particular route/trip/leg of the distribution system 100. Such an association may enable operator 304 to capture mailer container to trailer nesting information, capture timing and network transportation data, fill-in gaps with the distribution system 100 predictive workload planning of mail, and increase the transparency of mail through enhanced tracking. Additionally, the associations may increase the volume of mail which is included in metrics captured by the distribution system 100 and the control system 200. The associations also provide a revenue protection "control" by which operators can verify that particular items were loaded into specific trailers, and so forth. The associations also may eliminate potential to misplace items and reduce customer service complaints by increasing the accountability of items.

In some embodiments, the color coding of items for display may be automated. For example, when the operator 304 scans or enters a barcode of an item (for example, using the mobile computing device 240), the control system 200 may identify records associated with the barcode and identify a location at or route on which the item is expected to travel. The control system 200 may then compare the expected location or route with an actual location at which the scan occurred (for example, based on GPS information of the mobile computing device 240 used by the operator 304. If the scanned item is in an unexpected location, then the control system 200 may generate a display to the operator 304's mobile computing device 240 to include a color-coded indicator. For example, if the item is in an expected location or along an expected route, then the indicator may be green. If the item is in an expected location but is at risk of being delivered late (as compared to an expected delivery date or a committed delivery date), then the indicator may be yellow. If the item is in an unexpected location, then the indicator may be red. Such color-coding may allow the operator 304 to quickly identify which items need corrective actions to be taken without having to commit large amounts of time to researching the item.

FIGS. 6-9 are data flow diagrams show additional details as compared to FIGS. 4 and 5.

Figure 6:
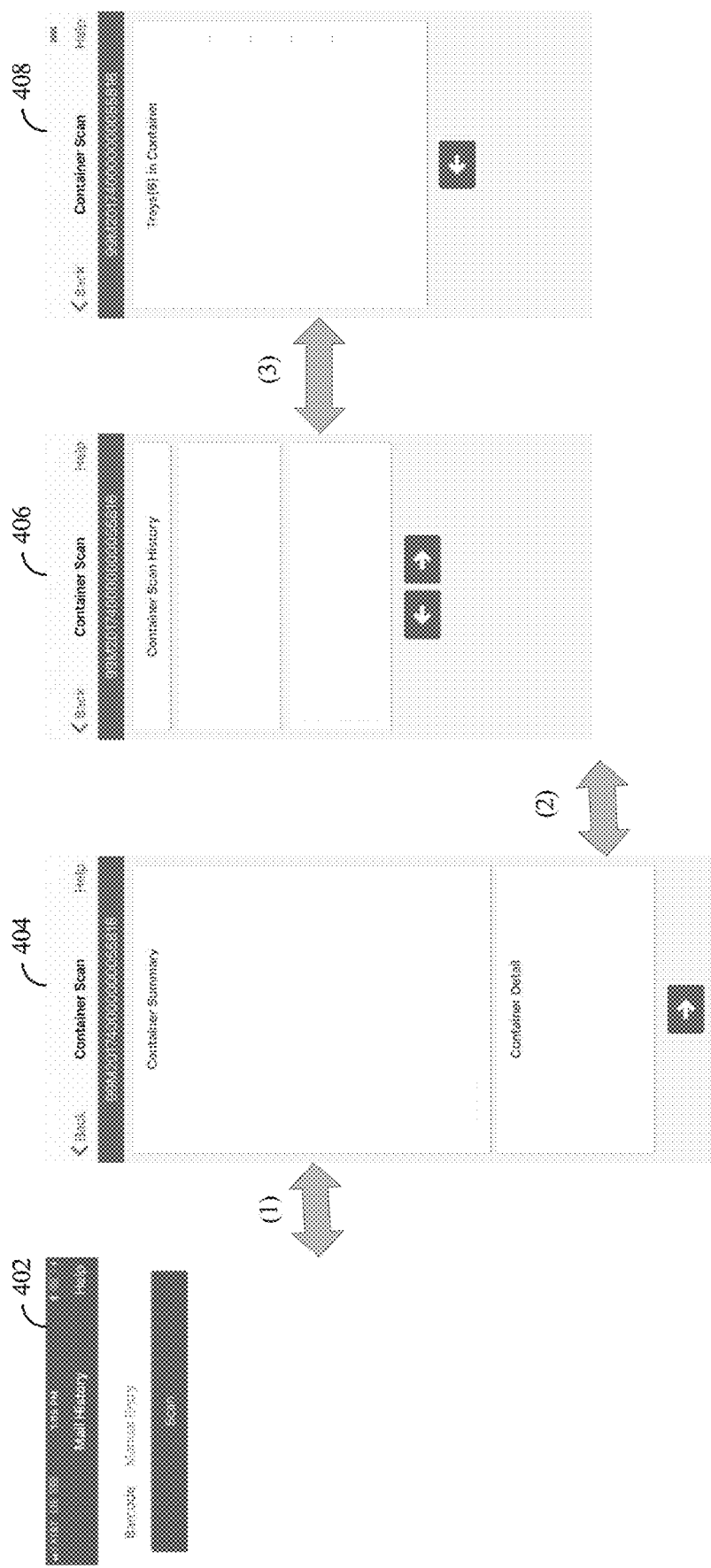
FIG. 6 is a data flow diagram showing additional details of FIG. 4 and/or FIG. 5.

For example, FIG. 6 shows the data flow for scan or entry of a container barcode in the item history application. At screen 402, the operator 304 can scan a barcode (of an item) or manually enter the barcode. In some embodiments, not shown here, the operator 304 has an option to review information for recent barcodes by selecting a displayed recent barcode. At screen 404, the operator 304 can review information related to a scanned container, as shown on screen 404, including mail class, color code, facility, scan source, container type, expected delivery date, intended destination, number of trays within the container, the number of mailpieces in the trays and the container, and other information. The operator 304 may use the navigation buttons on the screen to view additional information or view scan history, including type of scan, location of that scan, the scan source, the intended destination for that scan, etc. (screen 406). The scan history screen 406 shows the details from previous scan events of the container. The operator 304 can use the navigation buttons to view trays in the container (on screen 408) or review the container information of screen 404. At screen 408, the operator 304 can review details of specific trays in the scanned container, including the codes of the trays, the number of items in each tray, etc.

Figure 7:
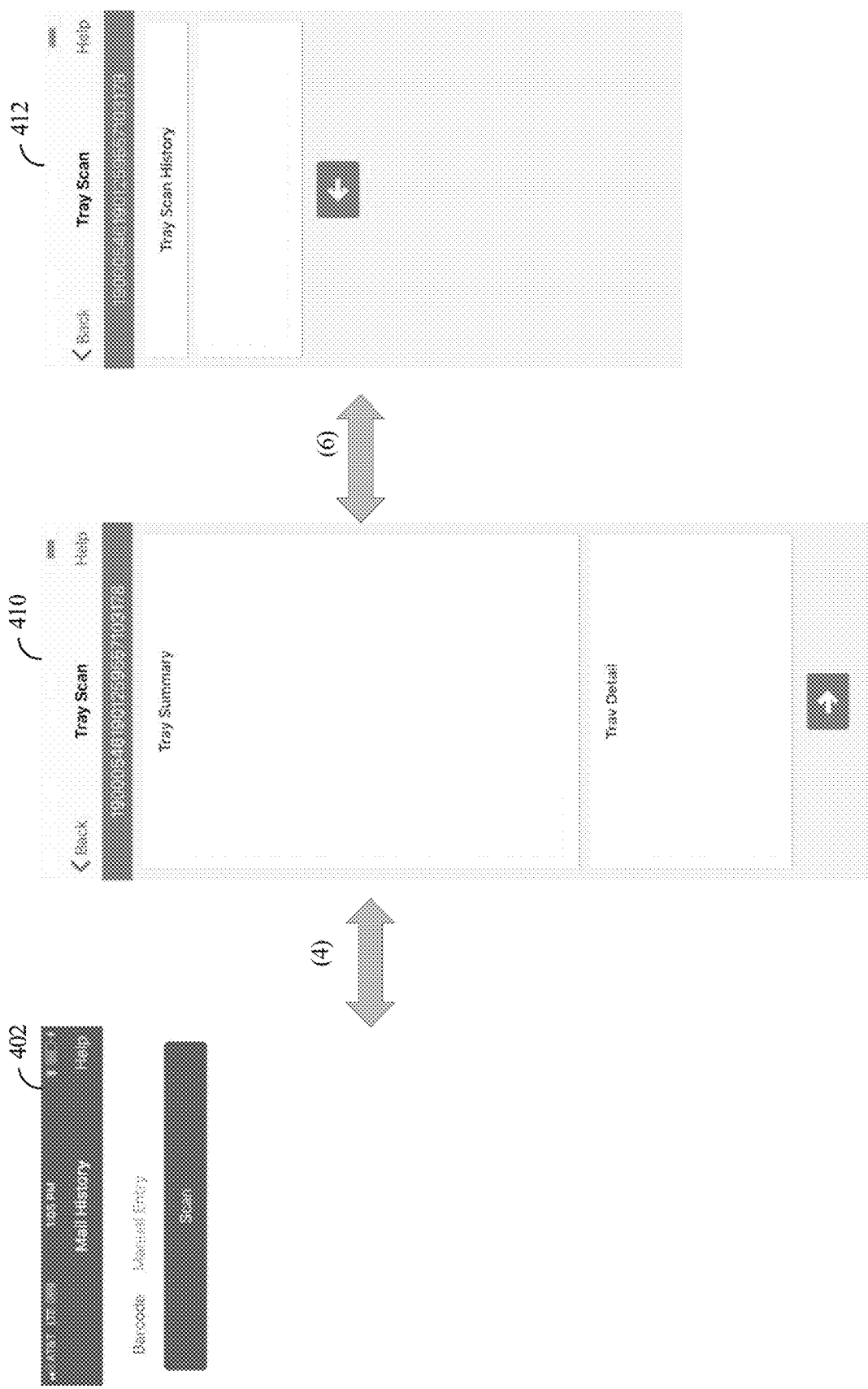
FIG. 7 is a data flow diagram showing additional details of FIG. 4 and/or FIG. 5.

FIG. 7 shows the data flow for scan or entry of a tray barcode in the item history application. At screen 402, the operator 304 can scan a barcode (of an item) or manually enter the barcode. In some embodiments, not shown here, the operator 304 has an option to review information for recent barcodes by selecting a displayed recent barcode. At screen 410, the operator 304 can review information related to a scanned tray as shown on screen 410. The operator 304 may use the navigation buttons on the screen to view additional information or view scan history (screen 412). The scan history screen 412 shows the details from previous scan events of the tray. The operator 304 can use the navigation buttons to review the tray information of screen 410.

Figure 8:
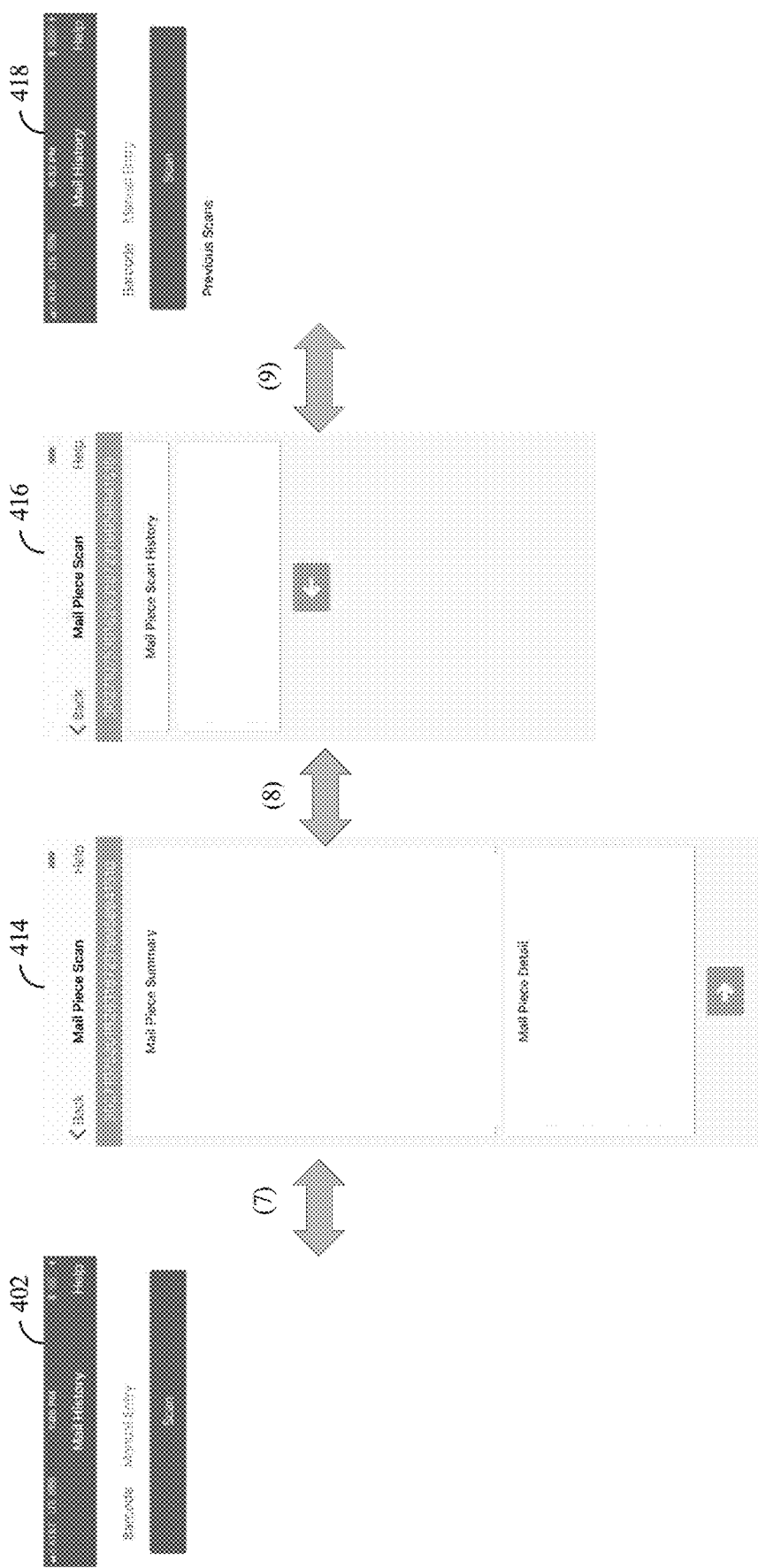
FIG. 8 is a data flow diagram showing additional details of FIG. 4 and/or FIG. 5.

FIG. 8 shows the data flow for scan or entry of an item barcode in the item history application. At screen 402, the operator 304 can scan a barcode (of an item) or manually enter the barcode. In some embodiments, not shown here, the operator 304 has an option to review information for recent barcodes by selecting a displayed recent barcode, for example using screen 418. At screen 414, the operator 304 can review information related to a scanned item, as shown on screen 414, which can be similar to those described elsewhere herein. The operator 304 may use the navigation buttons on the screen to view additional information or view scan history (screen 416) or at (9) to view barcode scan history at the screen 418. The scan history screen 416 shows the details from previous scan events. The operator 304 can use the navigation buttons to review the container information of screen 414.

The item history application may show screens associated with the container as a first color (for example, blue), screens associated with the tray as a second color (for example, green), and screens associated with the item as a third color (for example, yellow).

Figure 9:
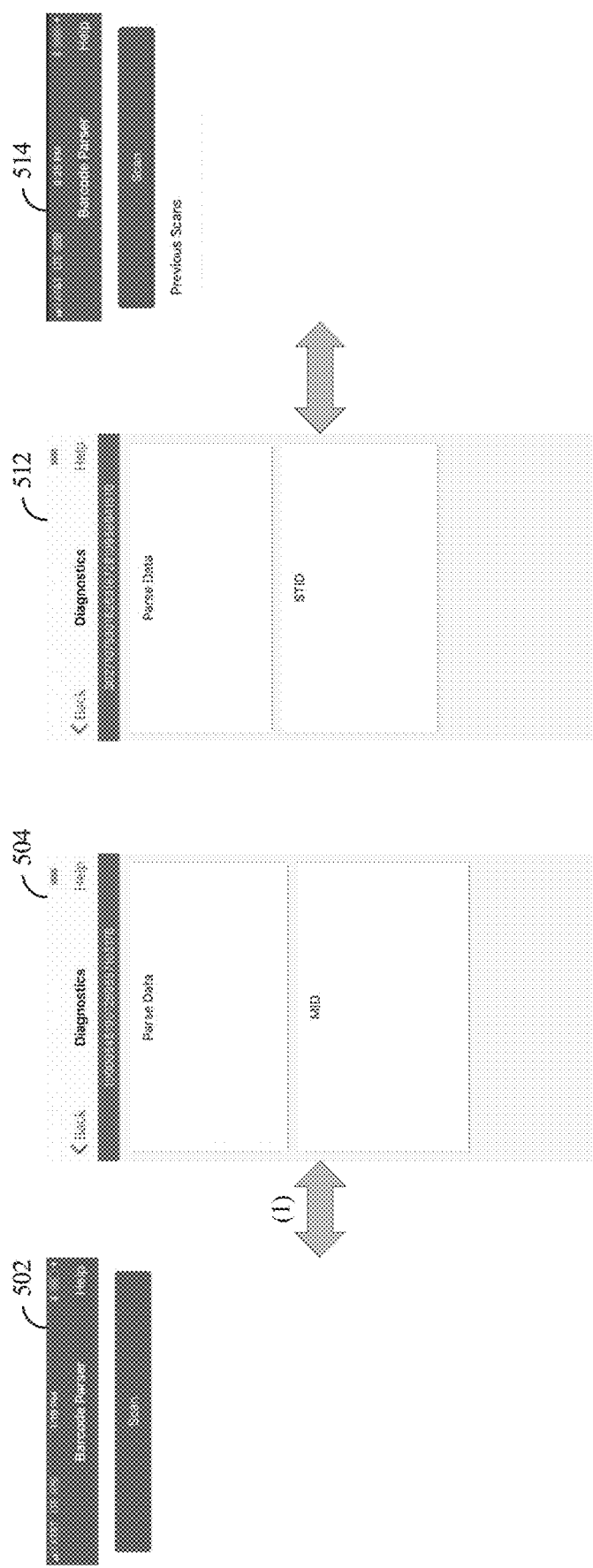
FIG. 9 is a data flow diagram showing additional details of FIG. 4 and/or FIG. 5.

FIG. 9 shows the data flow for scan or entry of a barcode in the barcode diagnostics application. At screen 502, the operator 304 can scan a barcode (of an item) or manually enter the barcode. In some embodiments, as shown in screen 514, the operator 304 has an option to review information for recent barcodes by selecting a displayed recent barcode. At screens 504 and 512, the operator 304 can review information related to the scanned barcode. This data may include parse data, MID, STID, and so forth. The operator 304 may use the navigation buttons on the screen to view additional information or view scan history.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as and ran under a conventional operating system. For example, any industry standard programming languages for which many commercial compilers can be used to create executable code may be used. The system control may also be written using interpreted languages.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it covers all modifications and alternatives coming within the true scope and spirit of the development as embodied in the attached claims.

What is claimed is:

1. A system for tracking items, the system comprising:
    a memory circuit storing a plurality of digital identifiers, wherein each digital identifier of the plurality of digital identifiers is associated with corresponding item information;
    a scanning device configured to:
        scan a computer readable code on an item;
    a server in communication with the scanning device, the server configured to:
        receive, from the scanning device, the scanned computer readable code;
        determine that the computer readable code cannot be read completely;
        identify one or more readable portions of the computer readable code;
        decode the one or more readable portions of the computer readable code;
        predict a candidate digital identifier associated with the item based on the decoded one or more readable portions of the computer readable code;
        query the memory circuit using the candidate digital identifier to identify a digital identifier from the plurality of digital identifiers that corresponds with the candidate digital identifier; and
        retrieve the digital identifier and the item information associated with the digital identifier from the memory circuit.

2. The system of claim 1, wherein the server is further configured to:
    receive, from the scanning device, a location of the scanning device; and
    predict the candidate digital identifier associated with the item based on the decoded one or more readable portions of the computer readable code and the location of the scanning device.

3. The system of claim 1, wherein the server is further configured to generate an output for display on the scanning device, wherein the output comprises the digital identifier and the item information associated with the digital identifier.

4. The system of claim 1, wherein server is further configured to:
    identify one or more unreadable portions of the computer readable code; and
    provide, via the scanning device, an image of the computer readable code, wherein the image of the computer readable code comprises an overlay identifying the one or more readable portions of the computer readable code and the one or more unreadable portions of the computer readable code.

5. The system of claim 1, wherein the server is configured to:
    identify one or more unreadable portions of the computer readable code;
    identify an error associated with the one or more unreadable portions of the computer readable code; and
    provide, via the scanning device, the error associated with the one or more unreadable portions of the computer readable code.

6. The system of claim 1, wherein the server is further configured to predict the candidate digital identifier associated with the item by:
    converting the one or more readable portions of the computer readable code into a partial identifier, wherein the partial identifier comprises one or more of: a symbology of the computer readable code, a type of the computer readable code, one or more data elements of the computer readable code, a mailer identifier, or a service type code; and
    predicting the candidate digital identifier based on the partial identifier.

7. The system of claim 1, wherein the server is further configured to predict the candidate digital identifier associated with the item by:
    prompting a user, via the scanning device, to provide a manually entered identifier associated with the item;

receiving, from the scanning device, the manually entered identifier associated with the item; and predicting the candidate digital identifier based on the one or more readable portions of the computer readable code and the manually entered identifier associated with the item.

8. A method for tracking items, the method comprising:

scanning, at a scanning device, a computer readable code on an item;

determining, by a server, that the computer readable code cannot be read completely;

identify, by the server, one or more readable portions of the computer readable code;

decoding, by the server, the one or more readable portions of the computer readable code;

predicting, by the server, a candidate digital identifier associated with the item based on the decoded one or more readable portions of the computer readable code;

querying a memory circuit of the server using the candidate digital identifier to identify a digital identifier that corresponds with the candidate digital identifier; and retrieving, from the memory circuit, the digital identifier and item information associated with the digital identifier from a memory circuit.

9. The method of claim 8, the method further comprising:

detecting, by the scanning device, a location where the computer readable code on the item was scanned; and predicting, by the server, the candidate digital identifier associated with the item based on the one or more readable portions of the computer readable code and the location where the computer readable code on the item was scanned.

10. The method of claim 8, the method further comprising:

displaying, via the scanning device, the digital identifier and the item information associated with the digital identifier.

11. The method of claim 8, the method further comprising:

identifying, by the server, one or more unreadable portions of the computer readable code; and displaying, via the scanning device, an image of the computer readable code, wherein the image of the computer readable code comprises an overlay identifying the one or more readable portions of the computer readable code and the one or more unreadable portions of the computer readable code.

12. The method of claim 8, the method further comprising:

identifying, by the server, one or more unreadable portions of the computer readable code;

identifying, by the server, an error associated with the one or more unreadable portions of the computer readable code; and displaying, via the scanning device, the error associated with the one or more unreadable portions of the computer readable code.

13. The method of claim 8, wherein predicting the candidate digital identifier associated with the item comprises:

converting, by the server, the one or more readable portions of the computer readable code into a partial identifier, wherein the partial identifier comprises one or more of: a symbology of the computer readable code, a type of the computer readable code, one or more data elements of the computer readable code, a mailer identifier, or a service type code; and predicting, by the server, the candidate digital identifier based on the partial identifier.

14. The method of claim 8, the method further comprising:

prompting a user, via the scanning device, to provide a manually entered identifier associated with the item;

receiving, via the scanning device, the manually entered identifier associated with the item; and predicting, by the server, the candidate digital identifier based on the one or more readable portions of the computer readable code and the manually entered identifier associated with the item.

15. A scanning device for tracking items, the scanning device configured to:

scan a computer readable code on an item;

determine that the computer readable code cannot be read completely;

identify one or more readable portions of the computer readable code;

decode the one or more readable portions computer readable code;

predict a candidate digital identifier associated with the item based on the decoded one or more readable portions of the computer readable code;

query a server using the candidate digital identifier to identify a corresponding digital identifier from a plurality of digital identifiers stored on a memory circuit of the server;

retrieve, from the server, the digital identifier and item information associated with the digital identifier; and display the digital identifier and the item information associated with the digital identifier.

16. The scanning device of claim 15, wherein the scanning device is further configured to:

detect a location of the scanning device; and predict the candidate digital identifier associated with the item based on the one or more readable portions of the computer readable code and the location of the scanning device.

17. The scanning device of claim 15, wherein the scanning device is further configured to:

identify one or more unreadable portions of the computer readable code; and display an image of the computer readable code, wherein the image of the computer readable code comprises an overlay configured to identify the one or more readable portions of the computer readable code and the one or more unreadable portions of the computer readable code.

18. The scanning device of claim 15, wherein the scanning device is further configured to:

identify one or more unreadable portions of the computer readable code;

identify an error associated with the one or more unreadable portions of the computer readable code; and display the error associated with the one or more unreadable portions of the computer readable code.

19. The scanning device of claim 15, wherein the scanning device is further configured to predict the candidate digital identifier associated with the item by:

converting the one or more readable portions of the computer readable code into a partial identifier, wherein the partial identifier comprises one or more of: a symbology of the computer readable code, a type of the computer readable code, one or more data elements of the computer readable code, a mailer identifier, or a service type code; and predicting the candidate digital identifier based on the partial identifier.

20. The scanning device of claim 15, wherein the scanning device is further configured to:
- prompt a user to provide a manually entered identifier associated with the item;
- receive the manually entered identifier associated with the item; and
- predict the candidate digital identifier based on the one or more readable portions of the computer readable code and the manually entered identifier associated with the item.

* * * * *